(12) United States Patent
Kaufman et al.

(10) Patent No.: US 11,786,824 B2
(45) Date of Patent: Oct. 17, 2023

(54) AUTOMATIC DETECTION OF PROHIBITED GAMING CONTENT

(71) Applicant: Roblox Corporation, San Mateo, CA (US)

(72) Inventors: Matt Kaufman, San Carlos, CA (US); Shyna Khurana, San Francisco, CA (US); Dean Neal Browne, San Carlos, CA (US); Arthur Remy Malan, Menlo Park, CA (US)

(73) Assignee: Roblox Corporation, San Mateo, CA (US)

( * ) Notice: Subject to any disclaimer, the term of this patent is extended or adjusted under 35 U.S.C. 154(b) by 81 days.

(21) Appl. No.: 17/172,866

(22) Filed: Feb. 10, 2021

(65) Prior Publication Data

US 2022/0249957 A1 Aug. 11, 2022

(51) Int. Cl.
*A63F 13/75* (2014.01)
*G06N 20/00* (2019.01)
*A63F 13/79* (2014.01)

(52) U.S. Cl.
CPC .............. *A63F 13/75* (2014.09); *A63F 13/79* (2014.09); *G06N 20/00* (2019.01)

(58) Field of Classification Search
None
See application file for complete search history.

(56) References Cited

U.S. PATENT DOCUMENTS

| | | | |
|---|---|---|---|
| 8,414,390 B1* | 4/2013 | Paleja | A63F 13/358 463/43 |
| 2002/0128061 A1 | 9/2002 | Blanco | |
| 2014/0051497 A1 | 2/2014 | Lang et al. | |
| 2017/0148264 A1 | 5/2017 | Pichette et al. | |
| 2018/0345152 A1* | 12/2018 | Duan | A63F 13/352 |
| 2020/0410241 A1 | 12/2020 | Sundareson | |
| 2022/0096937 A1* | 3/2022 | Dorn | A63F 13/53 |

OTHER PUBLICATIONS

WIPO, Written Opinion for International Patent Application No. PCT/US2022/012790, dated Apr. 21, 2022, 10 pages.
WIPO, International Search Report for International Patent Application No. PCT/US2022/012790, dated Apr. 21, 2022, 2 pages.

\* cited by examiner

*Primary Examiner* — Jason T Yen
(74) *Attorney, Agent, or Firm* — IP Spring

(57) ABSTRACT

Implementations described herein relate to methods, systems, and computer-readable media to automatically detect prohibited content. For example, a method can include receiving data associated with a game hosted on a gaming platform, the data indicative of at least one developer, at least one user, and game content, automatically assigning a classification to the game with a machine learning model, the classification based on the data indicative of the at least one developer, at least one user, and game content, determining whether the classification of the game meets a safety threshold, and based on determining that the classification of the game does not meet the safety threshold, identifying the game as having prohibited content.

20 Claims, 8 Drawing Sheets

AUTOMATIC DETECTION OF PROHIBITED GAMING CONTENT

TECHNICAL FIELD

Embodiments relate generally to computer-based gaming, and more particularly, to methods, systems, and computer readable media to automatically detect and prevent prohibited gaming content.

BACKGROUND

Some online gaming platforms allow users to access content such as games and game assets, connect with each other, interact with each other (e.g., within a game), and share information with each other via the Internet. Users of online gaming platforms may participate in multiplayer gaming environments in which games or parts of games have been provided for interaction and/or purchase.

When users search for game-related content (e.g., games, items for games, accessories for avatars, etc.) or other content, results based on factors such as popularity in terms, numbers of downloads by users, rating by users, etc., may be presented to a user. However, new or recently developed content may be presented that is without classification. In these circumstances, inappropriate or prohibited content may be easily accessed by users. Furthermore, as a number of users and developers increase, the amount of new content without classification also increases.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to automatically detecting and preventing prohibited content from reaching users. In some implementations, a computer-implemented method comprises: receiving data associated with a game hosted on a gaming platform, the data indicative of at least one developer, at least one user, and game content; automatically assigning a classification to the game with a machine learning model, the classification based on the data indicative of the at least one developer, at least one user, and game content; determining whether the classification of the game meets a safety threshold; and based on determining that the classification of the game does not meet the safety threshold, identifying the game as having prohibited content.

In some implementations, the data indicative of the at least one developer comprises one or more of: a tenure of the developer on the gaming platform, a number of games published on the gaming platform by the developer, behavioral data of users associated with the developer on the gaming platform, moderation history of the developer on the gaming platform, or an average classification of games associated with the developer on the gaming platform.

In some implementations, the data indicative of at least one user comprises one or more of: demographics of the user, a gameplay history of the user, behavioral data of other users associated with the user, moderation history of the user, chat history of the user, transaction history of the user, or an average classification of games played by the user.

In some implementations, the data indicative of the game content comprises one or more of: textual description of the game, title of the game, assets of the game, models that make up the game, actions within the game, or an average classification of one or more other games with content within a similarity threshold of the game content.

In some implementations, the method further comprises, based on the determination that the game content includes prohibited content, restricting access to the game content via the gaming platform.

According to another aspect, a computer-implemented method is provided. The computer-implemented method comprising: receiving data associated with a game hosted on a gaming platform, the data indicative of at least one developer, at least one user, and game content; determining input features of a machine learning model based on the data indicative of the at least one developer, the at least one user, and the game content; providing the input features to the machine learning model; and obtaining an output of the machine learning model based on the input features, the output including a classification of the game.

In some implementations, the data indicative of the at least one developer comprises one or more of: a tenure of the developer on the gaming platform, a number of games published on the gaming platform by the developer, behavioral data of users associated with the developer on the gaming platform, moderation history of the developer on the gaming platform, or an average classification of games associated with the developer on the gaming platform.

In some implementations, the data indicative of at least one user comprises one or more of: demographics of the user, a gameplay history of the user, behavioral data of other users associated with the user, moderation history of the user, chat history of the user, transaction history of the user, or an average classification of games played by the user.

In some implementations, the data indicative of the game content comprises one or more of: textual description of the game, title of the game, assets of the game, models that make up the game, actions within the game, or an average classification of one or more other games with content within a similarity threshold of the game content.

In some implementations, the classification of the game is a value indicative of the probability the game includes prohibited content.

According to another aspect, a system is provided. The system comprising: a memory with instructions stored thereon; and a processing device, coupled to the memory, the processing device configured to access the memory and execute the instructions, wherein the instructions cause the processing device to perform operations comprising: receiving data associated with a game, the data indicative of at least one developer, at least one user, and game content; automatically assigning a classification to the game with a machine learning model, the classification based on the data indicative of the at least one developer, at least one user, and game content; determining whether the classification of the game meets a safety threshold; and based on determining that the classification of the game does not meet the safety threshold, identifying the game as having prohibited content.

In some implementations, the data indicative of the at least one developer comprises one or more of: a tenure of the developer on the gaming platform, a number of games published on the gaming platform by the developer, behavioral data of users associated with the developer on the gaming platform, moderation history of the developer on the gaming platform, or an average classification of games associated with the developer on the gaming platform.

In some implementations, the data indicative of at least one user comprises one or more of: demographics of the user, a gameplay history of the user, behavioral data of other users associated with the user, moderation history of the user, chat history of the user, transaction history of the user, and an average classification of games played by the user.

In some implementations, the data indicative of the game content comprises one or more of: textual description of the game, title of the game, assets of the game, models that make up the game, actions within the game, or an average classification of one or more other games with content within a similarity threshold of the game content.

In some implementations, the operations further comprise, based on the determination that the game content includes prohibited content, restricting access to the game content via the gaming platform.

According to another aspect, a non-transitory computer-readable medium is provided. The non-transitory computer-readable medium with instructions stored thereon that, responsive to execution by a processing device, causes the processing device to perform operations comprising: receiving data associated with a game, the data indicative of at least one developer, at least one user, and game content; determining input features of a machine learning model based on the data indicative of the at least one developer, the at least one user, and the game content; providing the input features to the machine learning model; and obtaining an output of the machine learning model based on the input features, the output including a classification of the game.

In some implementations, the data indicative of the at least one developer comprises one or more of: a tenure of the developer on the gaming platform, a number of games published on the gaming platform by the developer, behavioral data of users associated with the developer on the gaming platform, moderation history of the developer on the gaming platform, or an average classification of games associated with the developer on the gaming platform.

In some implementations, the data indicative of at least one user comprises one or more of: demographics of the user, a gameplay history of the user, behavioral data of other users associated with the user, moderation history of the user, chat history of the user, transaction history of the user, or an average classification of games played by the user.

In some implementations, the data indicative of the game content comprises one or more of: textual description of the game, title of the game, assets of the game, models that make up the game, actions within the game, or an average classification of one or more other games with content within a similarity threshold of the game content.

In some implementations, the classification of the game is a value indicative of the probability the game includes prohibited content.

DETAILED DESCRIPTION

Figure 1:
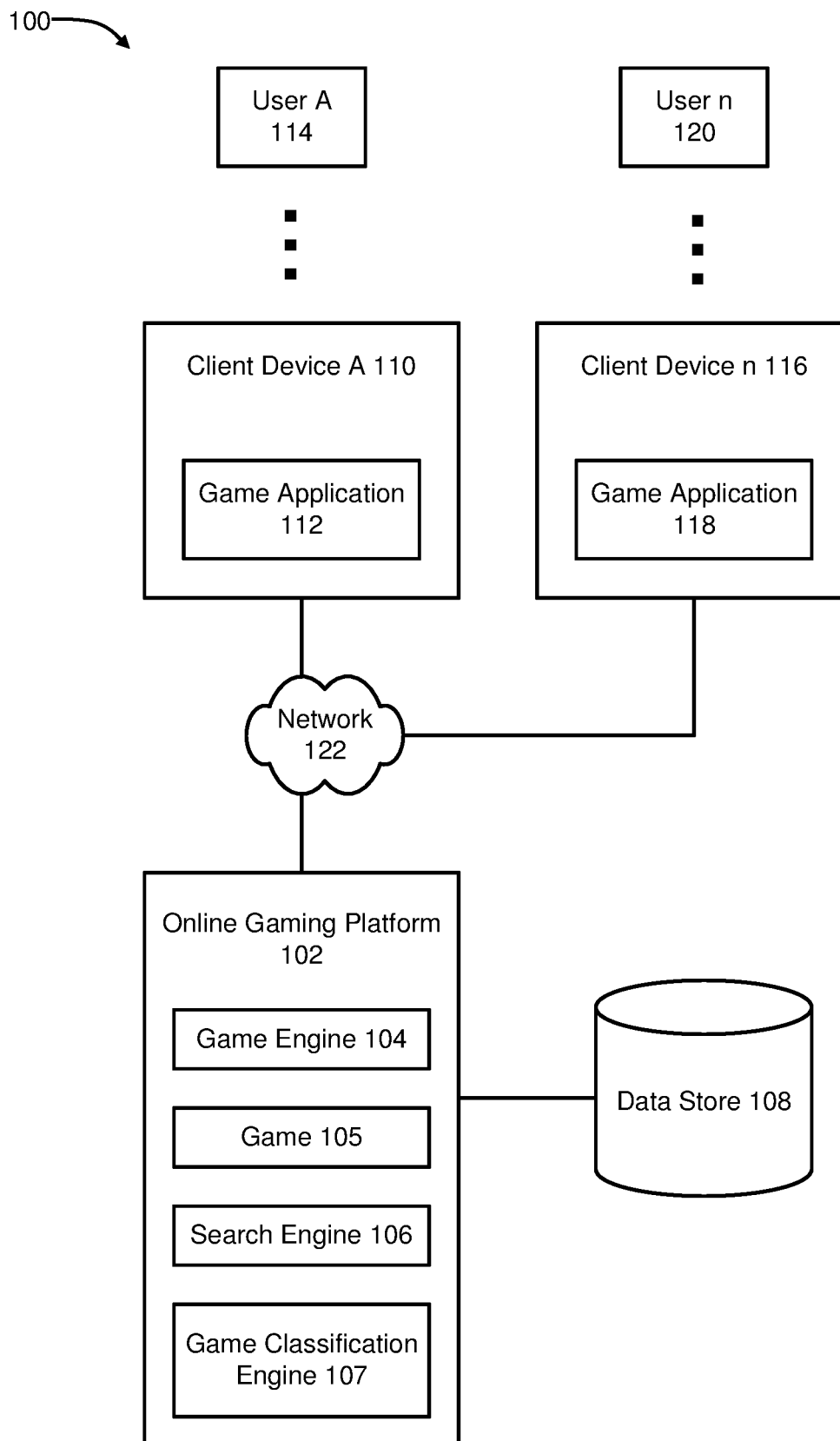
FIG. 1 is a diagram of an example network environment for automatic detection and prevention of prohibited content, in accordance with some implementations.

One or more implementations described herein relate to detection and prevention of prohibited items associated with an online gaming platform. Features can include automatically classifying games and items based on developer data, game data, user profile data, behavioral parameters, and/or other factors.

Features described herein provide automatic detection and prevention of prohibited content through intelligent classification of games, and associated game content, and training of machine learning models specific to identifying prohibited content. For example, user profile data, user behavioral parameters, user gameplay data, developer profile data, developer behavior data, and game data may be used to classify a game as including possibly prohibited content. Furthermore, the classifications may be augmented through feedback and administrative functions such that newly created content, which contains possibly prohibited content, is quickly identified before surfacing this content to users.

Through training of the machine learning model based on user interaction and other data, a game classification may be generated such that only games meeting a threshold classification of safety are presented to users. The machine learning model may be retrained periodically, thereby improving the classification of newly created content.

Additionally, internal & external data sources, such as social networks, external links to the online gaming platform, and other external data may be used to train the machine learning model to classify games by game content, user activity, user behavior, groups of users previously associated with prohibited content, groups of developers previously associated with prohibited content, and other similar criteria.

By classifying game content as it is created based on a plurality of data signals, prohibited content may be more easily restricted, obfuscated, and/or eliminated. Thus, the disclosed features provide technical advantages including reduction of manual searches of possibly prohibited game data as well as reduction in time spent interpreting false positives of prohibited content, thus leading to reduction of use of computational resources (e.g., computer memory, processor, networking traffic, of a server etc.) used to administer the online gaming platform. For example, when a piece of content is created, the machine learning model can quickly classify the likelihood it contains prohibited content based on external data, profile data, and behavioral data. Thus, extra search computations to manually review new items are eliminated, thus saving computational resources in monitoring prohibited content.

Online gaming platforms (also referred to as "user-generated content platforms" or "user-generated content systems") offer a variety of ways for users to interact with one another. For example, users of an online gaming platform may create games or other content or resources (e.g., characters, graphics, items for game play within a virtual world, etc.) within the gaming platform.

Users of an online gaming platform may work together towards a common goal in a game or in game creation, share various virtual gaming items, send electronic messages to one another, and so forth. Users of an online gaming platform may play games, e.g., including characters (avatars) or other game objects and mechanisms. An online gaming platform may also allow users of the platform to communicate with each other. For example, users of the online gaming platform may communicate with each other using voice messages (e.g., via voice chat), text messaging, video messaging, or a combination of the above. Some online gaming platforms can provide a virtual three-dimensional environment in which users can play an online game.

In order to help enhance the entertainment value of an online gaming platform, the platform can provide a search engine for games, game content, or other game related resources, where users of the online gaming platform may search for game-related content or such other content using the search engine. Since games and game resources may be being created, changed, and added to available game data at high rates by various users (including game creators/developers and/or game players), the search engine provides improved discoverability of available games and resources.

For example, a user can input a search query to the search engine that indicates a request for items or resources sought by the user. The search engine searches a set of game data and provides as outputs search results which may include a list of items and/or game-related resources that were determined by the search engine to match the search query, ranked by a search algorithm.

However, in some situations, search results provided by such search engines may include prohibited games and/or items. For example, games and/or items may be prohibited based on user age, user location, content licensing terms, content type, user device, etc. The search engine may provide a large number of search results, potentially including games or items that may include inappropriate content. In some online gaming platforms, users have the ability to create a large variety of games, game types, resources etc., thus causing a potentially large number of prohibited content to be surfaced. Furthermore, considering the large number of user-generated content on online gaming platforms, it may be difficult to monitor all search results for prohibited content.

In addition, the online gaming platform may have a large number of users, e.g., millions of users, who can use search functionality external to an online gaming platform to locate otherwise prohibited content. Thus, even if a search engine within the online gaming platform is configured to obfuscate known prohibited content, external resources may point to such prohibited content prior to the same being identified through the online gaming platform.

Figure 2:
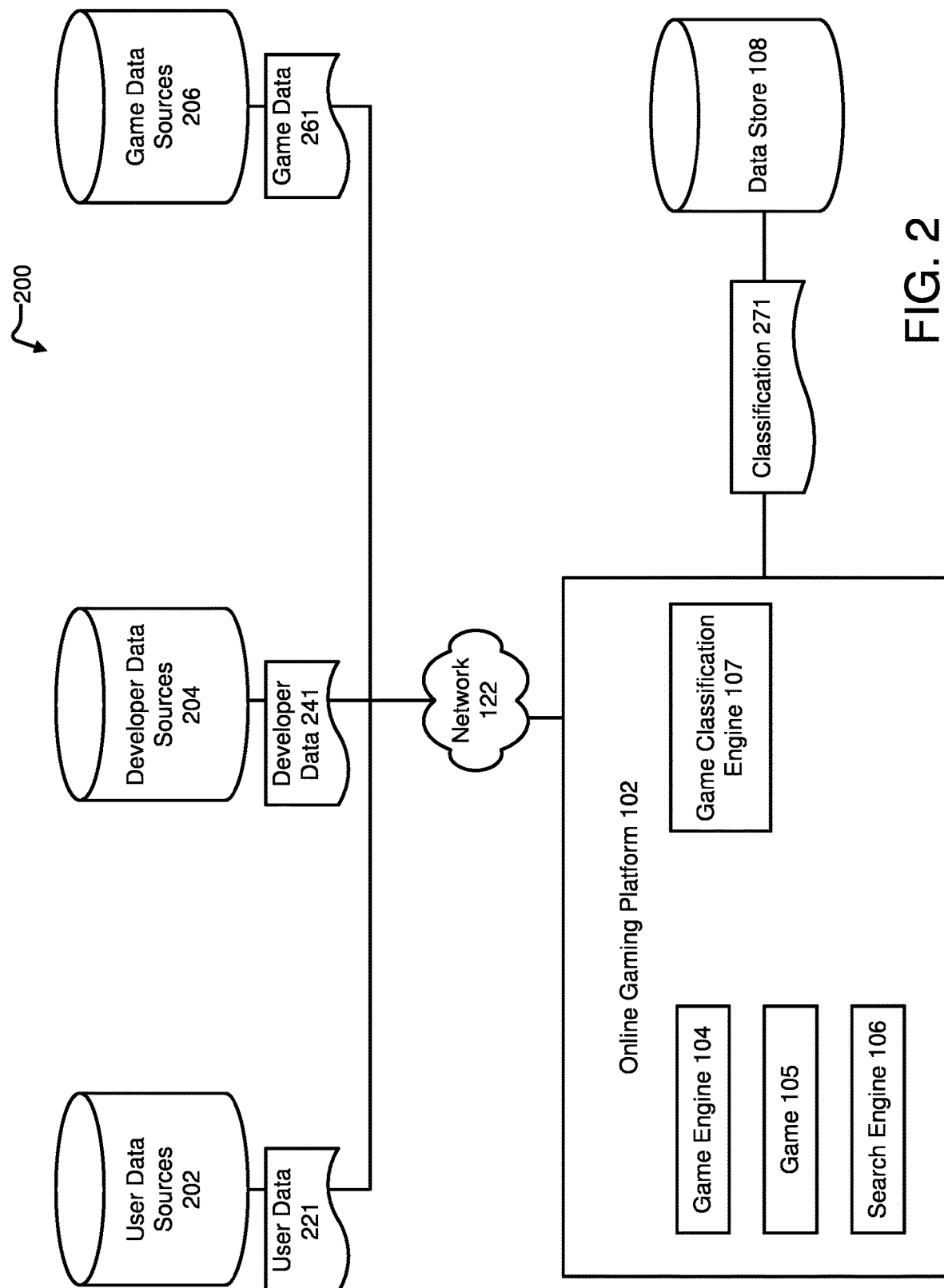
FIG. 2 is a diagram of an example network environment for automatic detection and prevention of prohibited content, in accordance with some implementations.

FIGS. 1 & 2: System Architecture

FIG. 1 illustrates an example network environment 100, in accordance with some implementations of the disclosure. The network environment 100 (also referred to as "system" herein) includes an online gaming platform 102, a first client device 110, a second client device 116 (generally referred to as "client devices 110/116" herein), and a network 122. The online gaming platform 102 can include, among other things, a game engine 104, one or more games 105, a search engine 106, a game classification engine 107, and a data store 108. The client device 110 can include a game application 112. The client device 116 can include a game application 118. Users 114 and 120 can use client devices 110 and 116, respectively, to interact with the online gaming platform 102.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online gaming platform 102 can include a server having one or more computing devices (e.g., a cloud computing system, a rackmount server, a server computer, cluster of physical servers, virtual server, etc.). In some implementations, a server may be included in the online gaming platform 102, be an independent system, or be part of another system or platform.

In some implementations, the online gaming platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 102 and to provide a user with access to online gaming platform 102. The online gaming platform 102 may also include a website (e.g., one or more webpages) or application back-end software that may be used to provide a user with access to content provided by online gaming platform 102. For example, users may access online gaming platform 102 using the game application 112/118 on client devices 110/116, respectively.

In some implementations, online gaming platform 102 may include a type of social network providing connections between users or a type of user-generated content system that allows users (e.g., end-users or consumers) to communicate with other users via the online gaming platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming platform 102 may be a virtual gaming platform. For example, the gaming platform may provide single-player or multiplayer games to a community of users that may access or interact with games (e.g., user generated games or other games) using client devices 110/116 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may search for games and game items, and participate in gameplay with other users in one or more games. In some implementations, a game may be played in real-time with other users of the game.

In some implementations, other collaboration platforms can be used with the classification features described herein instead of or in addition to online gaming platform 102 and/or search engine 106. For example, a social networking platform, purchasing platform, messaging platform, creation platform, etc. can be used with the classification features such that prohibited content is not surfaced to users.

In some implementations, gameplay may refer to interaction of one or more players using client devices (e.g., 110 and/or 116) within a game (e.g., 105) or the presentation of the interaction on a display or other output device of a client device 110 or 116.

One or more games 105 are provided by the online gaming platform. In some implementations, a game 105 can include an electronic file that can be executed or loaded using software, firmware or hardware configured to present the game content (e.g., digital media item) to an entity. In some implementations, a game application 112/118 may be executed and a game 105 rendered in connection with a game engine 104. In some implementations, a game 105 may have a common set of rules or common goal, and the environments of a game 105 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 105 may be collectively referred to a "world" or "gaming world" or "virtual world" or "universe" herein. An example of a world may be a 3D world of a game 105. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming platform 102 can host one or more games 105 and can permit users to interact with the games 105 (e.g., search for games, game-related content, or other content) using a game application 112/118 of client devices 110/116. Users (e.g., 114 and/or 120) of the online gaming platform 102 may play, create, interact with, or build games 105, search for games 105, communicate with other users, create and build objects (e.g., also referred to as "item(s)" or "game objects" or "virtual game item(s)" herein) of games 105, and/or search for objects. For example, in generating user-generated virtual items, users may create characters, decoration for the characters, one or more virtual environments for an interactive game, or build structures used in a game 105, among others.

In some implementations, users may buy, sell, or trade game virtual game objects, such as in-platform currency (e.g., virtual currency), with other users of the online gaming platform 102. In some implementations, online gaming platform 102 may transmit game content to game applications (e.g., 112). In some implementations, game content (also referred to as "content" herein) may refer to any data or software instructions (e.g., game objects, game, user information, video, images, commands, media item, etc.) associated with online gaming platform 102 or game applications.

In some implementations, game objects (e.g., also referred to as "item(s)" or "objects" or "virtual game item(s)" herein) may refer to objects that are used, created, shared or otherwise depicted in game applications 105 of the online gaming platform 102 or game applications 112 or 118 of the client devices 110/116. For example, game objects may include a part, model, character, tools, weapons, clothing, buildings, vehicles, currency, flora, fauna, components of the aforementioned (e.g., windows of a building), and so forth.

It may be noted that the online gaming platform 102 hosting games 105, is provided for purposes of illustration, rather than limitation. In some implementations, online gaming platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 105 may be associated with a particular user or a particular group of users (e.g., a private game), or made widely available to users of the online gaming platform 102 (e.g., a public game). In some implementations, where online gaming platform 102 associates one or more games 105 with a specific user or group of users, online gaming platform 102 may associated the specific user(s) with a game 105 using user account information (e.g., a user account identifier such as username and password). Similarly, in some implementations, online gaming platform 102 may associate a specific developer or group of developers with a game 105 using developer account information (e.g., a developer account identifier such as a username and password).

In some implementations, online gaming platform 102 or client devices 110/116 may include a game engine 104 or game application 112/118. The game engine 104 can include a game application similar to game application 112/118. In some implementations, game engine 104 may be used for the development or execution of games 105. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.). In some implementations, game applications 112/118 of client devices 110/116, respectively, may work independently, in collaboration with game engine 104 of online gaming platform 102, or a combination of both.

In some implementations, both the online gaming platform 102 and client devices 110/116 execute a game engine (104, 112, and 118, respectively). The online gaming platform 102 using game engine 104 may perform some or all the game engine functions (e.g., generate physics commands, rendering commands, etc.), or offload some or all the game engine functions to game engine 104 of client device 110. In some implementations, each game 105 may have a different ratio between the game engine functions that are performed on the online gaming platform 102 and the game engine functions that are performed on the client devices 110 and 116.

For example, the game engine 104 of the online gaming platform 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming platform 102 and client device 110 may be changed (e.g., dynamically) based on gameplay conditions. For example, if the number of users participating in gameplay of a game 105 exceeds a threshold number, the online gaming platform 102 may perform one or more game engine functions that were previously performed by the client devices 110 or 116.

For example, users may be playing a game 105 on client devices 110 and 116, and may send control instructions (e.g., user inputs, such as right, left, up, down, user election, or character position and velocity information, etc.) to the online gaming platform 102. Subsequent to receiving control instructions from the client devices 110 and 116, the online gaming platform 102 may send gameplay instructions (e.g., position and velocity information of the characters participating in the group gameplay or commands, such as rendering commands, collision commands, etc.) to the client devices 110 and 116 based on control instructions. For instance, the online gaming platform 102 may perform one or more logical operations (e.g., using game engine 104) on the control instructions to generate gameplay instruction for the client devices 110 and 116. In other instances, online gaming platform 102 may pass one or more or the control instructions from one client device 110 to other client devices (e.g., 116) participating in the game 105. The client devices 110 and 116 may use the gameplay instructions and render the gameplay for presentation on the displays of client devices 110 and 116.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming platform 102. In other implementations, the control instructions may be sent from a client device 110 to another client device (e.g., 116), where the other client device generates gameplay instructions using the local game engine 104. The control instructions may include instructions to play a voice communication message or other sounds from another user on an audio device (e.g., speakers, headphones, etc.).

In some implementations, gameplay instructions may refer to instructions that allow a client device 110 (or 116) to render gameplay of a game, such as a multiplayer game. The gameplay instructions may include one or more of user input (e.g., control instructions), character position and velocity information, or commands (e.g., physics commands, rendering commands, collision commands, etc.). As described in more detail herein, gameplay instructions issues by a user may affect a classification or rating. This classification may be a numerical representation of a level of trust that the associated user is not manipulating a character in an inappropriate manner (e.g., causing the character to perform prohibited or adult interactions). The associated classification may be stored in the data store 108 by the online gaming platform 102.

In some implementations, characters (or game objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the game 105. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming platform 102. In some implementations, creating, modifying, or customizing characters, other game objects, games 105, or game environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In some implementations, the online gaming platform 102 may store characters created by users in the data store 108. In some implementations, the online gaming platform 102 maintains a character catalog and game catalog that may be presented to users via the search engine 106, game engine 104, game 105, and/or client device 110/116. In some implementations, the game catalog includes images of games stored on the online gaming platform 102. In addition, a user may select a character (e.g., a character created by the user or other user) from the character catalog to participate in the chosen game. The character catalog includes images of characters stored on the online gaming platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming platform 102.

As described in more detail herein, each portion of a game, including characters, character appearances, avatars, clothing, components, items, and other portions may include a classification or rating. This classification may be a numerical representation of a level of trust that the associated portion does not contain prohibited content. The associated classification may be stored in the data store 108 by the online gaming platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online gaming platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the game application 112 or 118, respectively. In one implementation, the game application 112 or 118 may permit users to use and interact with online gaming platform 102, such as search for a game or other content, control a virtual character in a virtual game hosted by online gaming platform 102, or view or upload content, such as games 105, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 or 116 and allows users to interact with online gaming platform 102. The game application may render, display, or present the content (e.g., a web page, a user interface, a media viewer) to a user. In an implementation, the game application may also include an embedded media player (e.g., a Flash® player) that is embedded in a web page.

According to aspects of the disclosure, the game application 112/118 may be an online gaming platform application for users to build, create, edit, upload content to the online gaming platform 102 as well as interact with online gaming platform 102 (e.g., play games 105 hosted by online gaming platform 102). As such, the game application 112/118 may be provided to the client device 110 or 116 by the online gaming platform 102. In another example, the game application 112/118 may be an application that is downloaded from a server.

In some implementations, a user may login to online gaming platform 102 via the game application. The user may access a user account by providing user account information (e.g., username and password) where the user account is associated with one or more characters available to participate in one or more games 105 of online gaming platform 102.

In general, functions described as being performed by the online gaming platform 102 can also be performed by the client device(s) 110 or 116, or a server, in other implementations if appropriate. In addition, the functionality attributed to a particular component can be performed by different or multiple components operating together. The online gaming platform 102 can also be accessed as a service provided to other systems or devices through appropriate application programming interfaces (APIs), and thus is not limited to use in websites.

In some implementations, online gaming platform 102 may include a search engine 106. In some implementations, the search engine 106 may be a system, application, or module that permits the online gaming platform 102 to provide search functionality to users, where the search functionality permits the users to search for games, game-related content, items, listing of items, or other content within the online gaming platform 102.

In some implementations, online gaming platform 102 may include a game classification engine 107. In some implementations, the game classification engine 107 may be a system, application, or module that determines a classification for a game or associated gaming content, a user, and/or a developer. The classification may be a numerical measure of likelihood that the associated component includes (or, if a user or developer, may be likely to generate) prohibited content. The classification may be determined through a machine learning model (supervised or unsupervised) that takes features (or a feature vector) as input and provides an output value indicative of the likelihood that the input features are associated with prohibited content.

As used herein, the phrase "prohibited content" refers generally to any content deemed inappropriate for the online gaming platform. For example, prohibited content can include adult content, extremist content, and content related to any dangerous, illegal, and/or unethical activities. As one example, adult content can include, but is not limited to, adult interactions between avatars/characters, adult clothing, adult accessories, adult language, and/or other inappropriate content. Other prohibited content may include game sessions or scenarios with altered physics engines which allow adult interactions between characters and/or objects. Still further, other prohibited content may include euphemisms in language and other circumvention techniques employed by users in attempts to promote prohibited content.

In general, the search engine 106 may utilize a filter configured to determine if the classification value for any searched content meets a threshold of safety (e.g., not likely to include prohibited content) before providing results. Furthermore, the online gaming platform 102 may also offer recommendations to some users, e.g., via a home screen, interface, or other similar feature. In these scenarios, the online gaming platform 102 may also utilize a methodology and/or filter configured to determine if the classification value for any content to be promoted meets a threshold of safety before providing recommendations. Still further, the online gaming platform 102 may also utilize the classification value in indexing content such that any content being accessed is assessed by the classification value to determine whether it meets a threshold of safety.

However, some prohibited content may be linked external to the online gaming platform 102, for example, through links from an external data source. Accordingly, while the search engine 106 has been described herein as functioning to surface content being queried by a user, the classification generated by the game classification engine 107 may also be used to restrict access to any links to any content deemed to be possibly inappropriate or prohibited, such that external access may be reduced or limited.

Thus, the classification values generated by the game classification engine 107 may also be used to administer the online gaming platform 102 in an automated manner, such that games, content, or other media with a classification below a threshold may be quarantined or held for further review before allowing access through client devices 110/116 or any external links. Hereinafter, operation of the classification engine 107 is described more fully with reference to FIG. 2.

FIG. 2 illustrates an example network environment 200, in accordance with some implementations of the disclosure. The network environment 200 (also referred to as "system" herein) includes the online gaming platform 102, user data sources 202, developer data sources 204, game data sources 206, and network 122. The online gaming platform 102 can include, among other things, the game engine 104, one or more games 105, the search engine 106, the game classification engine 107, and the data store 108.

As described briefly above, user account information (e.g., a user account identifier such as username and password) may be retained by the online gaming platform 102. The user account information may allow the online gaming platform 102, with appropriate user permissions granted by the user, to identify user data sources 202 used by the user. In this manner, user data 221 may be retrieved from publicly available external data sources as well as from the online gaming platform 102 itself. The publicly available external data sources may include, but are not limited to, social networking websites, news forums, newsgroups, online discussion forums, or other webpages where a user of the online gaming platform 102 provides links to content provided by the online gaming platform 102. The user data 221 may also include any available user data related to use of the online gaming platform 102, including previous use of prohibited content, congregation with other users of prohibited content, and previous interaction with developers of prohibited content.

For each user, the stored data may be based on user-specific permissions provided by the user. Users are provided with options to choose the specific data that may be stored, and parameters associated with storage of such data (e.g., time period for which data may be stored), and how the data can be used (e.g., aggregated, processed, or otherwise analyzed). Further, storage of user data is performed in compliance with applicable regulations (e.g., in the user's geography). Certain data may be processed such that personally-identifiable information (PII) of the users is not stored or cannot be retrieved from the stored data. Access to the data for various programs of the platform is restricted such that only specific programs that perform particular user-permitted actions can access the data. For example, data may be aggregated (e.g., over multiple user accounts) or otherwise processed prior to provision of data to certain programs.

User data is accessed only with specific permission from the user. Users are provided with information on how user data may be stored and/or utilized, the features/functions enabled based on user data, and is provided with options to restrict access to user data (e.g., no access for some portions of data; limited access; etc.). Users can change permissions for data access at any time, view the user data that may be accessed, and/or remove portions of user data.

Developer account information (e.g., a developer account identifier such as username and password) may also be retained by the online gaming platform 102. The developer account information may allow the online gaming platform 102, with appropriate user permissions granted by the developers, to identify developer data sources 204 used by the developer. In this manner, developer data 241 may be retrieved from publicly available external data sources as well as from the online gaming platform 102 itself. The publicly available external data sources may include, but are not limited to, social networking websites, news forums, newsgroups, online discussion forums, or other webpages where a developer of game content for the online gaming platform 102 provides links to content provided by the online gaming platform 102. The developer data 241 may also include any available data related to use of the online gaming platform 102, including previous development of prohibited content, facilitation of manipulation by users to avoid rules/procedures to avoid prohibited content, and previous interaction with users of prohibited content.

For each developer, the stored data may be based on developer-specific permissions provided by the developer. Developers are provided with options to choose the specific data that may be stored, and parameters associated with storage of such data (e.g., time period for which data may be stored), and how the data can be used (e.g., aggregated, processed, or otherwise analyzed). Further, storage of developer data is performed in compliance with applicable regulations (e.g., in the developer's geography). Certain data may be processed such that personally-identifiable information (PII) of the developers is not stored or cannot be retrieved from the stored data. Access to the data for various programs of the platform is restricted such that only specific programs that perform particular developer-permitted actions can access the data. For example, data may be aggregated (e.g., over multiple developer accounts) or otherwise processed prior to provision of data to certain programs.

Developer data is accessed only with specific permission from the developer. Developers are provided with information on how developer data may be stored and/or utilized, the features/functions enabled based on developer data, and is provided with options to restrict access to developer data (e.g., no access for some portions of data; limited access; etc.). Developers can change permissions for data access at any time, view the developer data that may be accessed, and/or remove portions of developer data.

Game data 261 may also be retrieved from game data sources 206 such as new websites, forums, ratings web sites, and other publicly available data sources and/or external game data sources. The game data 261 may also include data retrieved from within the online gaming platform 102 itself. The data sources 206 may include ratings or textual descriptions of possibly prohibited content, euphemisms for prohibited content (e.g., Condo game, HOA, etc.) and other similar data. Furthermore, the data sources 206 may include links (e.g., hyperlinks) to access possibly prohibited game content.

Game data is accessed only with specific permission from the developer. Developers are provided with information on how game data may be stored and/or utilized, the features/functions enabled based on game data, and is provided with options to restrict access to game data (e.g., no access for some portions of data; limited access; etc.). Developers can change permissions for data access at any time, view the game data that may be accessed, and/or remove portions of game data.

In some implementations, the game classification engine 107 may provide one or more of user data 221, developer data 241, and game data 261 as input to a machine learning model that is configured to output a value indicative of the likelihood that the user data 221, developer data 241, and game data 261 is associated with prohibited content, e.g., a numerical value or other value. For example, user data 221 may be used to determine the frequency a particular user accesses prohibited content. Developer data 241 and game data 261 may also reflect a number of users that frequently access prohibited content, also congregating or accessing a particular game. In this example, the input of this data may output, from the machine learning model, a probability that the accessed content contains prohibited content. In an additional example, the machine learning model may determine that a large number of relatively new user account frequently access prohibited content. Therefore, a large number of user data 221 reflecting new user status and accessing the same game as shown in game data 261, may also cause an output of probability that the game contains prohibited content. Furthermore, user data 221 reflecting previous moderation history or anomalous behaviors on the online gaming platform 102 (e.g., a relatively old, silent account resurrected after a relatively large amount of time has passed) may also cause an output of probability that accessed games contain prohibited content. These and other examples are non-exhaustive and for illustrative purposed only, as the machine learning model may further identify other trends or relationships related to prohibited content.

Thereafter, the output may be used to generate classification 271. It is noted that although described as a general classification, the classification 271 may also be a "user classification," "game classification," and/or "developer classification," depending upon data being classified, such that some users or developers are prohibited from access due to history of using/creating prohibited content.

Upon generation, the classification 271 may be used to restrict access to the content (including access from external access through links). Additionally, any restricted or obfuscated content may be edited by a user or developer to remove any prohibited content. In this example, a new classification may be generated subsequent to the editing. If the new classification exceeds a threshold, the associated content may then surface normally and be accessed by users. In some implementations, the game classification engine 107 may perform one or more of the operations described below in connection with the flowcharts shown in FIGS. 6 and 7, utilizing the features illustrated in FIGS. 3, 4, and 5.

FIG. 3: User Data

Figure 3:
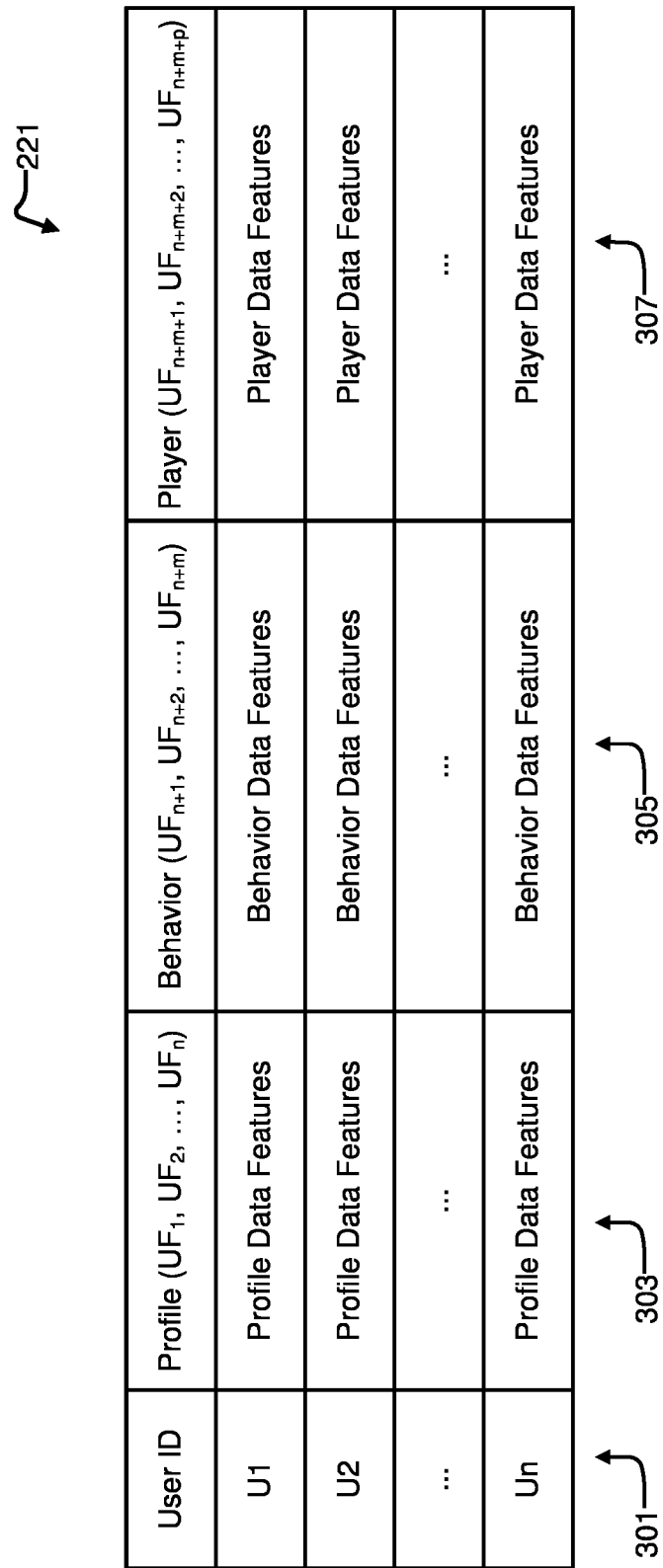
FIG. 3 is a schematic of example user data and input features, in accordance with some implementations.

FIG. 3 is a schematic that illustrates user data 221, in accordance with some implementations. In some implementations, with permission from users, user data 221 may be accessed and/or stored by the online gaming platform 102, e.g., in data store 108. The user data 221 may include, but is not limited to, User IDs 301, profile data features 303, behavioral data features 305, player data features 307, and/or other data features. It is noted that although illustrated in tabular form, any suitable data storage form may be used to organize the user data 221.

For each user, the stored data may be based on user-specific permissions provided by the user. Users are provided with options to choose the specific data that may be stored, and parameters associated with storage of such data (e.g., time period for which data may be stored), and how the data can be used (e.g., aggregated, processed, or otherwise analyzed). Further, storage of user data is performed in compliance with applicable regulations (e.g., in the user's geography). Certain data may be processed such that personally-identifiable information (PII) of the users is not stored or cannot be retrieved from the stored data. Access to the data for various programs of the platform is restricted such that only specific programs that perform particular user-permitted actions can access the data. For example, data may be aggregated (e.g., over multiple user accounts) or otherwise processed prior to provision of data to certain programs.

Profile data features 303 may include relatively static features about a user. For example, in some implementations, the profile data features 303 can include age, data of registration/sign-up, gender, language, region/locale, client device type, time of access, whether the user is a platform subscriber, moderation history (e.g., any warnings or bans in player history), and/or other suitable profile data features. Other suitable profile data features may also be applicable, and may include other data features such as nicknames, secondary language, most used characters/avatars, awards/achievements, connections to other players (e.g., a social graph), links to other platforms, and other data features.

Behavioral data features 305 may include dynamic features as well as static features. For example, in some implementations, the behavioral data features 305 can include purchase history (e.g., bought at least one item last week), types of items purchased, types of items viewed, gameplay history (e.g., played "pizza place" daily for a month), types of games played, engagement measures (e.g., engagement level, engagement time, etc.), new user designations (e.g., no prior behavioral data), prior search data (e.g., searched for a particular types of items, such as clothing items for avatars, weaponry, decorative items, etc.), and other suitable behavioral data features, as stored by or otherwise available to the online gaming platform. Additionally, other suitable behavioral data may include a 'collective group behavior' of players in prohibited games. For example, in addition to examining gameplay and purchase history at a user-level, "herd-behavior" may be analyzed (e.g., did a game suddenly attract a lot of users coming from an offsite link?). Other suitable behavioral data features may also be applicable.

Player data features 307 may include dynamic features. For example, in some implementations, the player data features 307 can include data related to the user playing a game as a player; including, available chat history, audio transcriptions, game types played, other players interacted with, age of account, duration of game types played, IP addresses (e.g., if a user is playing from a particular external service, it may be an automated or "bot" account, and other suitable player data features. Other suitable player data features may also be applicable.

Accordingly, the user data 221 may include, at least, an age of the user, demographics of the user, a gameplay history of the user, behavioral data of other users associated with the user, moderation history of the user, chat history of the user, transaction history of the user, moderation history, number of alternate accounts (if available), activity recency (e.g., did the player became active after a long time on the platform?), and an average classification of games played by the user. Other user data 221 is also applicable. The user data 221 may be utilized to identify groupings of similar users and establish that similar users may also engage in similar behavior. For example, a neighborhood clustering function may be used to determine if a user associated with user data 221 is similar to a user that has been identified as having engaged with prohibited content. Similarly, a distance function may be used to determine a level of similarity of a user associated with user data 221 and an example user that engages (or has previously engaged with) prohibited content. Additionally, user data 202 may be used to determine external relationships between users such that other inferences as to the likelihood of engagement with prohibited content can be determined.

Figure 4:
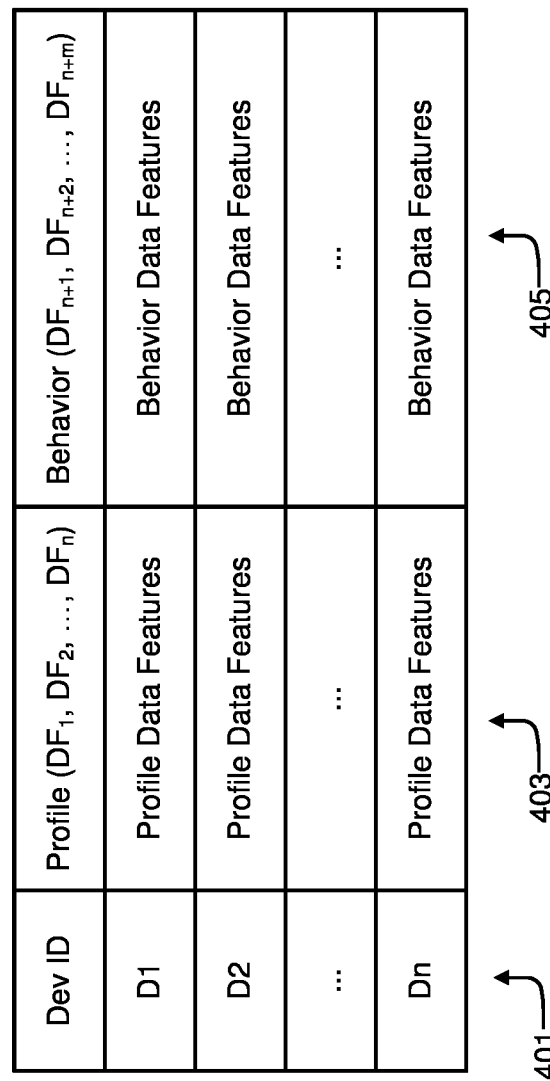
FIG. 4 is a schematic of example developer data and input features, in accordance with some implementations.

FIG. 4: Developer Data

FIG. 4 is a schematic that illustrates developer data 241, in accordance with some implementations. In some implementations, with permission from developers, developer data 241 may be stored by the online gaming platform 102, e.g., in data store 108. The developer data 241 may include, but is not limited to, Developer IDs 401, profile data features 403, behavioral data features 405, and/or other data features. It is noted that although illustrated in tabular form, any suitable data storage form may be used to organize the developer data 241.

For each developer, the stored data may be based on developer-specific permissions provided by the developer. Developers are provided with options to choose the specific data that may be stored, and parameters associated with storage of such data (e.g., time period for which data may be stored), and how the data can be used (e.g., aggregated, processed, or otherwise analyzed). Further, storage of developer data is performed in compliance with applicable regulations (e.g., in the developer's geography). Certain data may be processed such that personally-identifiable information (PII) of the developers is not stored or cannot be retrieved from the stored data. Access to the data for various programs of the platform is restricted such that only specific programs that perform particular developer-permitted actions can access the data. For example, data may be aggregated (e.g., over multiple developer accounts) or otherwise processed prior to provision of data to certain programs.

Profile data features 403 may include relatively static features about a developer. For example, in some implementations, the profile data features 403 can include company/employer association, language, region/locale, device type, time of access, whether the developer is associated with a larger group of developers, and/or other suitable profile data features. Other suitable profile data features may also be applicable, and may include other data features such as nicknames, secondary language, famous characters/avatars, included awards/achievements goals, connections to other developers or players (e.g., a social graph), links to other platforms, and other data features, as stored by or otherwise available to the online gaming platform.

Behavioral data features 405 may include dynamic features as well as static features. For example, in some implementations, the behavioral data features 405 can include types of items created, types of games created, frequency of new content creation, engagement measures (e.g., engagement level, engagement time, etc.), new developer designations (e.g., no prior behavioral data), age of developer account, existence/number of alternate accounts (if available), moderation history, prior search data (e.g., searched for a particular types of items, such as clothing items for avatars, weaponry, decorative items, etc.), and other suitable behavioral data features. Other suitable behavioral data features may also be applicable.

Accordingly, developer data 241 may include, at least, a tenure of the developer, account verification status, existence of alternate accounts (if available), moderation history, a number of games published by the developer, frequency of game publication, behavioral data of users associated with the developer, moderation history of the developer, and an average classification of games associated with the developer. Other developer data 241 is also applicable. The developer data 241 may be utilized to identify a level of similarity of a developer associated with developer data 241 and any user that engages (or has previously engaged with) prohibited content. Additionally, developer data 204 may be used to determine external relationships between developers and users such that other inferences as to the likelihood of creation/engagement with prohibited content can be determined.

FIG. 5: Game Data

Figure 5:
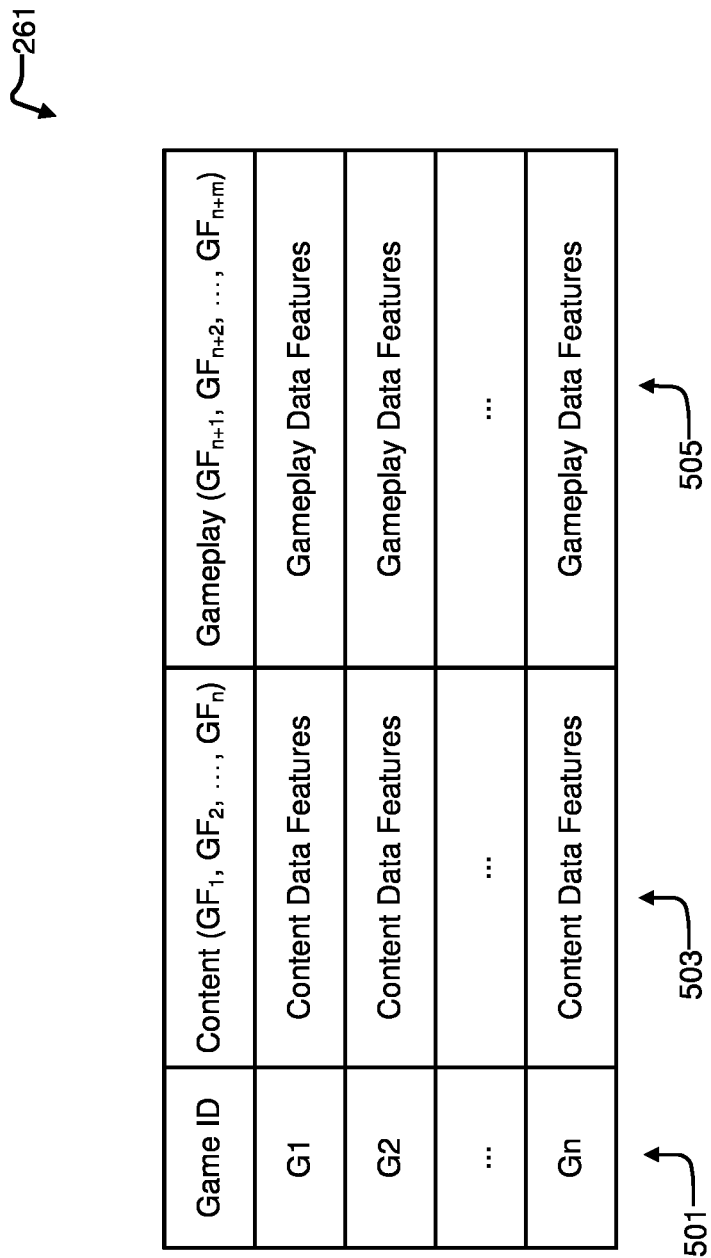
FIG. 5 is a schematic of example game data and input features, in accordance with some implementations.

FIG. 5 is a schematic that illustrates game data 261, in accordance with some implementations. In some implementations, game data 261 may be stored by the online gaming platform 102, e.g., in data store 108. The game data 261 may include, but is not limited to, Game IDs 501, content data features 503, gameplay data features 505, and/or other data features. It is noted that although illustrated in tabular form, any suitable data storage form may be used to organize the game data 261.

In some implementations, game data 261 includes descriptions, assets, places or game levels, intent, actions, and developer reputations associated with a game 105. The game data 261 may therefore include one or more of textual description of the game content, title of the game content, assets of the game content, models that make up the game content (e.g., game levels, models, etc.), actions within the game content, and an average classification of similar games associated with the game content. Other game data 261 is also applicable. The game data 261 may be used to determine a likelihood that the associated game includes prohibited content.

Additionally, external game data 106 may include additional textual data, descriptions, and euphemisms that are useful in determining a likelihood that an associated game includes prohibited content. For example, and without limitation, a game description textual analysis of word usage, phrasing patterns, and other linguistic elements may provide an indicator that a game includes prohibited content. Additionally, a game described repeatedly on a website known to host explicit or prohibited content may be an indicator that the game includes prohibited content. Furthermore, additional analysis may include analysis of abuse reports against a game. For example, analysis may include reports against games where a user describes keywords/expressions that indicate they played a game with potentially prohibited content (e.g., "'Please take this game down. It has adult content or explicit images.").

Hereinafter, details related to training of the machine learning model and classification are described with reference to FIG. 6.

Figure 6:
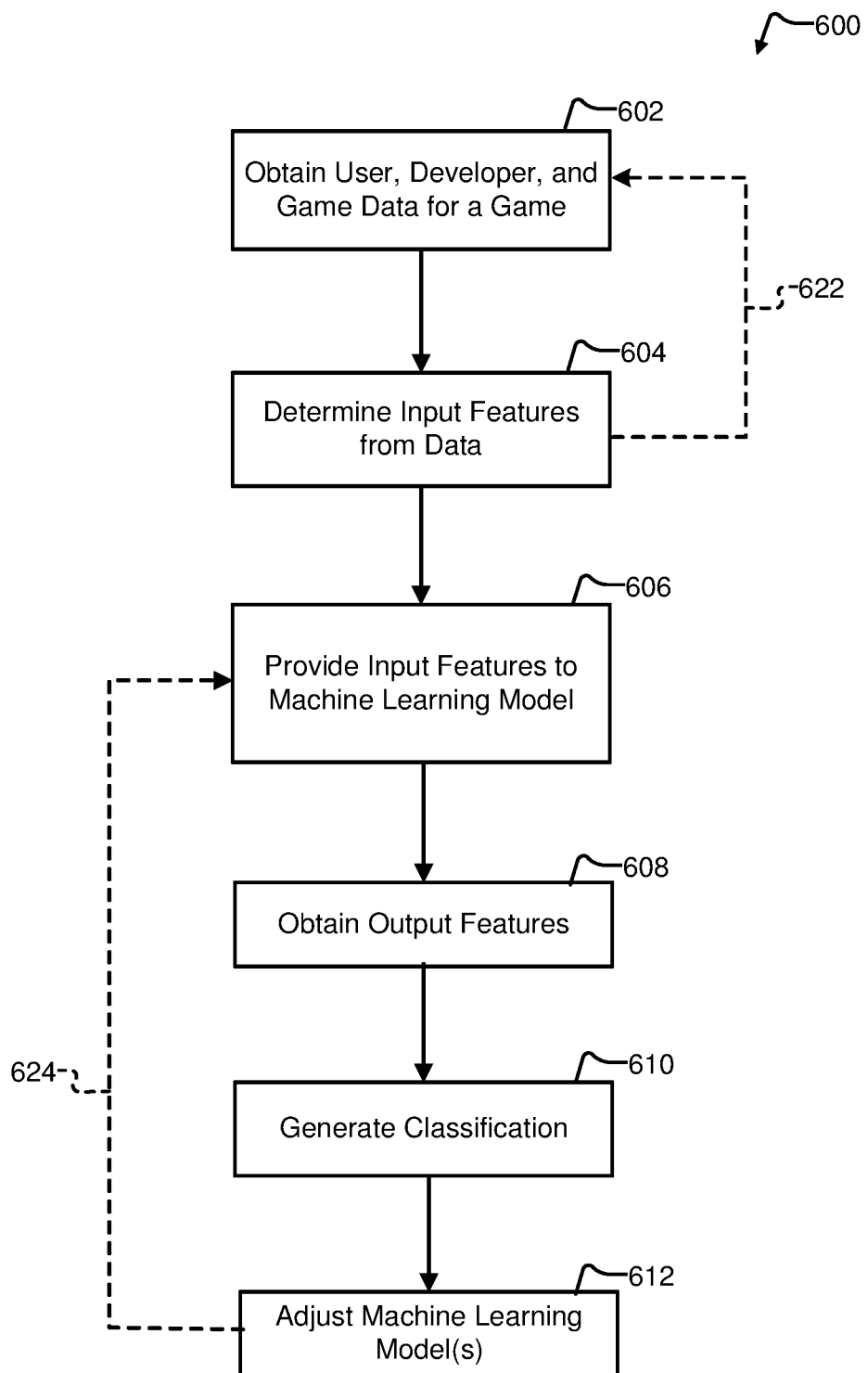
FIG. 6 is a flowchart of an example method to train a machine learning model and generate game classifications, in accordance with some implementations.

FIG. 6: Example Method to Train Models and Classify Content

FIG. 6 is a flowchart of an example method 600 to train a machine learning model and classify content, in accordance with some implementations. In some implementations, method 600 can be implemented, for example, on a server system, e.g., online gaming platform 102 as shown in FIG. 1. In some implementations, some or all of the method 600 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 600. Method 600 may begin at block 602.

Blocks 602-604 illustrate creation of input features for a machine learning model. In block 402, user data for a plurality of users, developer data associated with a game or content, and game data associated with the game or content, is obtained with permission from corresponding data owners (e.g., game players, other users, game developers, etc.), e.g., at a server. The data can include user data (e.g., 221), developer data (e.g., 241), and game data (e.g., 261). The user data may include age, gender, language, region/locale, client device type, time of access, and other suitable user data. The user data may also include purchase history, types of items purchased, viewing history, types of items viewed, gameplay history, types of games played, engagement measures, new user designations, prior search data, and other suitable user data. Developer data may include development history, prior administrative issues, prior prohibited content, and other suitable developer data. Game data may include text data describing items, actions, and other content. Game data may also include external data describing gameplay or other attributes. Block 602 may be followed by block 604.

In block 604, input features may be determined from the obtained user data 221, developer data 241, and game data 261. For example, the input features may include features 303, 305, 307, 403, 405, 503, and 505, organized by user ID 301, developer ID 401, and game ID 501. The input features may relate to user activity, static user features, developer activity, static developer features, and game features for input to a machine learning algorithm. While FIGS. 3-5 shows input features in tabular form, it may be understood that obtained user data 221, developer data 241, and game data 261 may be processed in various ways to obtain input features. For example, in some implementations, a multidimensional vector with a numerical value for each dimension and/or a matrix representation may be obtained based on the obtained user data 221, developer data 241, and game data 261, e.g., by transforming the input data into the multidimensional vector. The transformation may be carried out by a machine learning model, or other suitable technique.

In some implementations, block 604 may be followed by block 602, as indicated by operation 622. For example, the determination of input features may be performed multiple times until input features for a threshold number of users, developers, or games have been determined, or until the available data has been analyzed to determine input features. In some implementations, blocks 602-604 may be performed periodically, e.g., once every hour, once every day, etc. or when at least a threshold amount of user/developer/game data that has not previously been processed becomes available. Once the input features have been determined, block 604 may be followed by block 606.

Blocks 606-612 illustrate training of a machine learning model. At block 606, the method may include providing the input features to a machine learning model. The machine learning model may be configured to generate, based on the input features, a likelihood that an associated game or game content item is associated with prohibited content.

The machine learning model may include coefficients for nodes (e.g., neural network nodes). The machine learning model may be initialized and trained.

Generally, the training may be performed with supervised or unsupervised learning. Furthermore, according to some implementations, if implemented using a single node and function, an administrator may hand-inspect the machine learning model (e.g., node coefficients) and/or model input (feature values of input features) and outputs along with model performance (whether the output generated by the model meet accuracy criteria or a basic safety threshold). For example, according to one implementation, historical user data, developer data, and game data may be input at block 606. If the model output indicates that the game meets a predetermined or desired safety threshold (e.g., the model outputs a classification that accurately establishes whether an associated content includes prohibited content), the model training may be deemed complete. Alternatively, the model may be re-trained based on additional historical user data, developer data, and game data until the predetermined or desired safety threshold is exceeded. Block 606 may be followed by block 608.

At block 608, output features that include a numerical value for each user, developer, and game considered is obtained from the machine learning model. For example, the machine learning model generates as output a set of user, developer, and game classification values. Generally, the output values are based on the input features, which in some cases can include a previous classification of a user and developer. According to some implementations, the output of the machine learning model is a single value representative of the classification of a game or content within a game based on the developer associated with the game and the users interacting with the game. Block 608 may be followed by block 610.

At block 610, a classification is generated for each game based on the output features. In some implementations, the classification may be generated such that it is within a defined numerical scale, for example, 1-10 or 1-100. In this manner, a safety threshold may be defined as a number within the defined numerical scale (e.g., 5 or 55). Therefore, for classifications falling below the threshold, an inference as to the likelihood that the item contains prohibited content may be made. Block 610 may be followed by block 612.

At block 612, at least one model parameter for the machine learning model is adjusted based on a comparison of the generated classification with a known classification for each item. In some implementations, the known classification is based on historical data indicating whether the game, user, or developer is associated with prohibited content.

For example, generated classifications can be compared with actual observed behavior of a subset of users, a subset of developers, and/or actual games with prohibited content. These comparisons may be used as feedback to train the machine learning model, e.g., by adjusting weights on the node(s) of the machine learning model.

In some implementations, the training may be repeated periodically as shown by operation 624. The time period for a next round of training may be a predetermined or desired time period such as every daily, weekly, monthly, or otherwise. The training may also be repeated until the generated classifications and the known classifications are within a threshold distance.

Furthermore, in some implementations, various portions of method 600 may be repeated periodically. For example, blocks 602-604 may be performed to generate new features, e.g., once a week, once a month, on demand, when a certain number of new users join the platform, when the platform changes in other ways such as new games, new game items, new avatar accessories, etc. become available on the platform, etc. Furthermore, the training (blocks 606-612) may be performed separately from the generation of input features, in some implementations. For example, a model may be trained without changing the input features, e.g., when model performance falls below a threshold, if prohibited content begins to surface after initial training, or any other changes to the platform occur. In this manner, updated user data based on user profile data and behavioral parameters, updated developer data, and updated game data may be taken into consideration by performing operations 622 and 624 for fine-tuning performance.

Blocks 602-612 can be performed (or repeated) in a different order than described above and/or one or more blocks can be omitted. For example, feature generation (blocks 602-604) may be performed independently of model training (blocks 606-612). Further, training of multiple models (e.g., one model for generating user classification, one model for generating developer classification, and one model for generating game classification) may be performed in parallel, e.g., by performing blocks 606-612 in parallel for different models.

Figure 7:
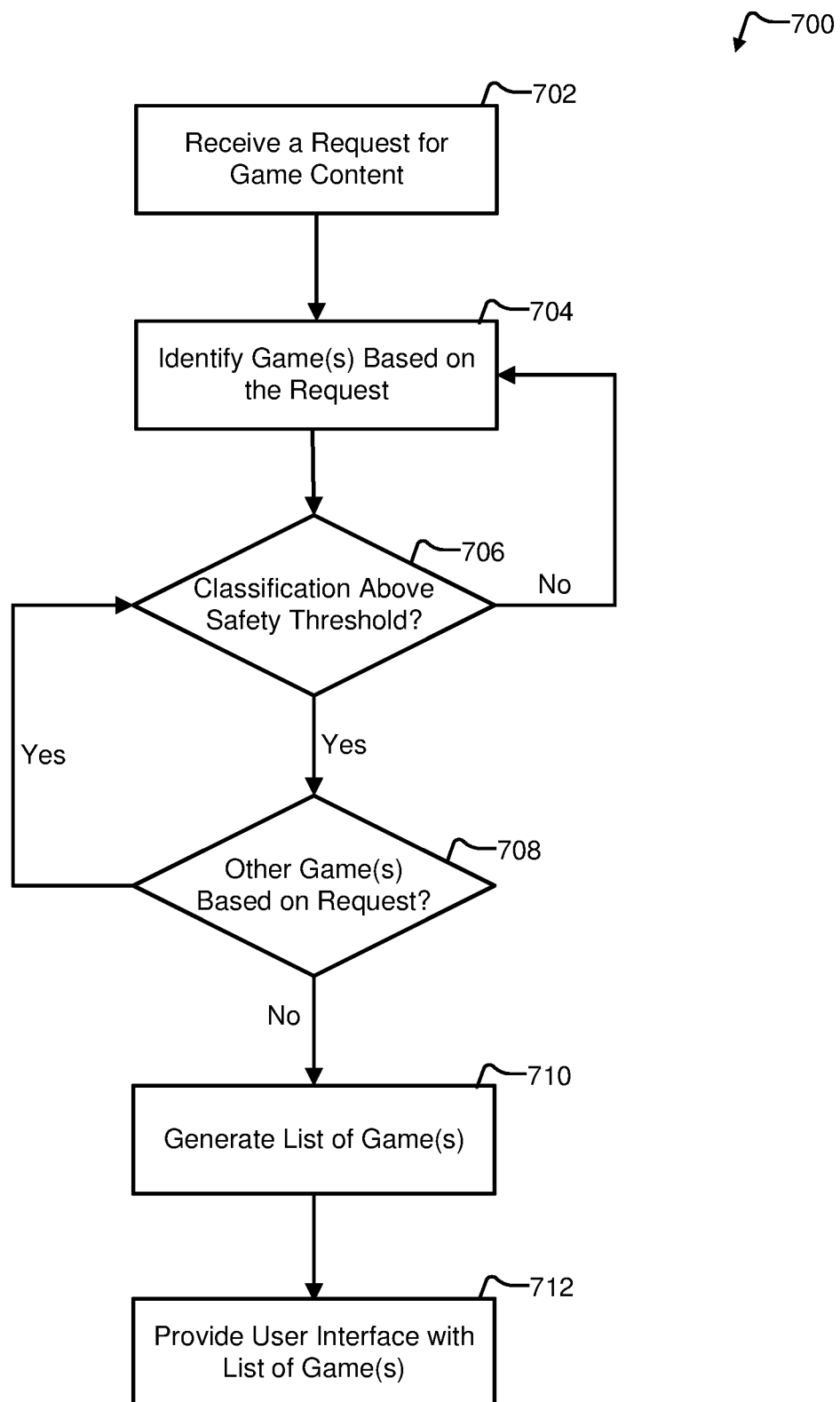
FIG. 7 is a flowchart of an example method to present non-prohibited game content, in accordance with some implementations.

After training an initial set of machine learning models, or upon implementing a set of pre-trained or default initialized machine learning models (e.g., prior to training), the models may be used to generate classifications of items in the online gaming platform 102, as described more fully with reference to FIG. 7.

FIG. 7: Surfacing Content Based on Classification

FIG. 7 is a flowchart of an example method 700 to provide content to users based on classification, in accordance with some implementations. In some implementations, method 700 can be implemented, for example, on a server system, e.g., online gaming platform 102 as shown in FIG. 1 and FIG. 2. In some implementations, some or all of the method 700 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 700. Method 700 may begin at block 702.

At block 702, a request for game content available on an online gaming platform (e.g., 102) may be received from a user (e.g., 114/120). For example, the user may utilize a search engine or other interface (e.g., browsing interface) provided by the platform. The list of available items may be stored in the online gaming platform 102, for example, through data store 106, in some implementations. The request may also be embodied as activation or selection of a hyperlink to content available on the online gaming platform (e.g., a link from an external source such as a website, social network, or newsgroup). The hyperlink or "link" may include a direct link or a query including identifying data such as a GameID (e.g., 501) or other data. Block 702 may be followed by block 704.

At block 704, a particular game or content is identified based on the request. For example, if the request is a search query, a list of matching games may be returned through a search engine on the online gaming platform. Similarly, a database query may be performed to identify one or more games or other content items. Block 704 may be followed by block 706.

At block 706, a classification for a game (or multiple classifications for multiple games) may be received, e.g., by applying a machine learning model. The classification(s) may be compared to a predetermined or desired safety threshold to determine if the associated content is above the threshold. If the classification is not above the threshold, the method may include identifying other games or content until a safety threshold is exceeded. Block 706 may be followed by block 708.

At block 708, other games or content identified by the method may be determined to exceed the threshold. Block 708 may be followed by block 710.

At block 710, a list of items exceeding the safety threshold (or a single item, in some implementations) is generated. The list of items is therefore tailored to include only non-prohibited content based on the trained machine learning model of FIG. 6. Block 710 may be followed by block 712.

At block 712, a user interface is provided to the user that includes the list of game(s) and/or game content. The user interface is therefore presented without prohibited content. It is noted that if the request at block 702 is a link to a particular game or content, only the associated game or content may be returned if its associated classification exceeds the safety threshold.

As described above, the machine learning model (or separate models) may be retrained periodically. Furthermore, the safety threshold may also be altered periodically to ensure that a reasonable percentage of prohibited content is restricted and desired safety parameters are met or exceeded. In this regard, the safety threshold may be reduced if too many non-prohibited games or content are restricted. Similarly, the safety threshold may be increased if one or more prohibited games or content are surfaced to users. In some implementations, user feedback and developer feedback may be used to monitor classifications and retrain machine learning models. Additionally, administrators of the online gaming platform 102 may manually adjust the machine learning model, the classifications, or other attributes, to alter the surfacing on non-prohibited content classified as prohibited.

Blocks 702-712 can be performed (or repeated) in a different order than described above and/or one or more blocks can be omitted. Methods 600 and/or 700 can be performed on a server (e.g., 102) and/or a client device (e.g., 110 or 116). Furthermore, portions of the methods 600 and 700 may be combined and performed in sequence or in parallel, according to any desired implementation.

As described above, the techniques of classification based on user data, developer data, and game data may be used to classify content on the online gaming platform before surfacing the content to users. In this manner, users will not be provided prohibited content even when accessing the online gaming platform using external links designed to circumvent other safety protocols. Furthermore, automatic classification may be used to augment typical administering and/or moderating of the online gaming platform such that parental controls and other restrictions on content are more able to identify and prevent surfacing of prohibited content to users.

Hereinafter, a more detailed description of various computing devices that may be used to implement different devices illustrated in FIG. 1 and FIG. 2 is provided with reference to FIG. 8.

Figure 8:
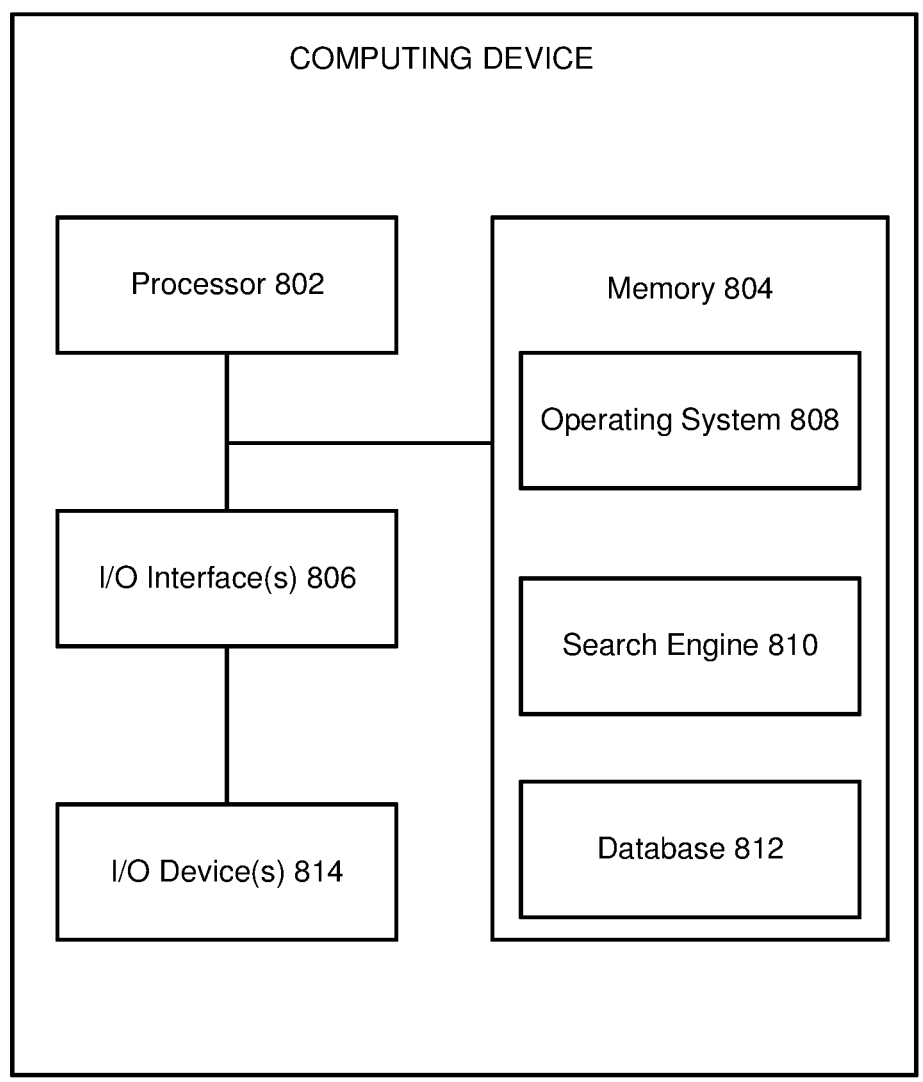
FIG. 8 is a block diagram illustrating an example computing device which may be used to implement one or more features described herein, in accordance with some implementations.

FIG. 8 is a block diagram of an example computing device 800 which may be used to implement one or more features described herein, in accordance with some implementations. In one example, device 800 may be used to implement a computer device, (e.g., 102, 110, and/or 116 of FIG. 1), and perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, microphone, etc.).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, a search engine application 810 and associated data 812. In some implementations, the search engine application 810 can include instructions that enable processor 802 to perform the functions described herein, e.g., some or all of the methods of FIGS. 6 and 7. In some implementations, the search engine application 810 may also include one or more machine learning models for generating content classification and for providing user interfaces and/or other features of the platform based on the classification, as described herein.

For example, memory 804 can include software instructions for a search engine 810 that can provide search while observing content classifications (e.g., restricting prohibited content) within an online gaming platform (e.g., 102). Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 108), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 804, I/O interface 806, software blocks 808 and 810, and database 812. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While the online gaming platform 102 is described as performing operations as described in some implementations herein, any suitable component or combination of components of online gaming platform 102 or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 600 and/or 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which certain implementations discussed herein may obtain or use user data (e.g., user demographics, user behavioral data on the platform, user search history, items purchased and/or viewed, user's friendships on the platform, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   receiving data associated with a game hosted on a gaming platform, the data indicative of at least one developer, at least one user, and game content;
   automatically assigning a classification to the game with a machine learning model, the classification based on the data indicative of the at least one developer, at least one user, and game content;
   determining whether the classification of the game meets a safety threshold; and
   based on determining that the classification of the game does not meet the safety threshold, identifying the game as having prohibited content.

2. The computer-implemented method of claim 1, wherein the data indicative of the at least one developer comprises one or more of: a tenure of the developer on the gaming platform, a number of games published on the gaming platform by the developer, behavioral data of users associated with the developer on the gaming platform, moderation history of the developer on the gaming platform, or an average classification of games associated with the developer on the gaming platform.

3. The computer-implemented method of claim 1, wherein the data indicative of at least one user comprises one or more of: demographics of the user, a gameplay history of the user, behavioral data of other users associated with the user, moderation history of the user, chat history of the user, transaction history of the user, or an average classification of games played by the user.

4. The computer-implemented method of claim 1, wherein the data indicative of the game content comprises one or more of: textual description of the game, title of the game, assets of the game, models that make up the game, actions within the game, or an average classification of one or more other games with content within a similarity threshold of the game content.

5. The computer-implemented method of claim 1, further comprising, based on the determination that the game content includes prohibited content, restricting access to the game content via the gaming platform.

6. A computer-implemented method comprising:
   receiving data associated with a game hosted on a gaming platform, the data indicative of at least one developer, at least one user, and game content;
   determining input features of a machine learning model based on the data indicative of the at least one developer, the at least one user, and the game content;
   providing the input features to the machine learning model; and
   obtaining an output of the machine learning model based on the input features, the output including a classification of the game.

7. The computer-implemented method of claim 6, wherein the data indicative of the at least one developer comprises one or more of: a tenure of the developer on the gaming platform, a number of games published on the gaming platform by the developer, behavioral data of users associated with the developer on the gaming platform, moderation history of the developer on the gaming platform, or an average classification of games associated with the developer on the gaming platform.

8. The computer-implemented method of claim 6, wherein the data indicative of at least one user comprises one or more of: demographics of the user, a gameplay history of the user, behavioral data of other users associated with the user, moderation history of the user, chat history of the user, transaction history of the user, or an average classification of games played by the user.

9. The computer-implemented method of claim 6, wherein the data indicative of the game content comprises one or more of: textual description of the game, title of the game, assets of the game, models that make up the game, actions within the game, or an average classification of one or more other games with content within a similarity threshold of the game content.

10. The computer-implemented method of claim 6, wherein the classification of the game is a value indicative of the probability the game includes prohibited content.

11. A system comprising:
   a memory with instructions stored thereon; and
   a processing device, coupled to the memory, the processing device configured to access the memory and execute the instructions, wherein the instructions cause the processing device to perform operations comprising:
   receiving data associated with a game, the data indicative of at least one developer, at least one user, and game content;
   automatically assigning a classification to the game with a machine learning model, the classification based on the data indicative of the at least one developer, at least one user, and game content;
   determining whether the classification of the game meets a safety threshold; and
   based on determining that the classification of the game does not meet the safety threshold, identifying the game as having prohibited content.

12. The system of claim 11, wherein the data indicative of the at least one developer comprises one or more of: a tenure of the developer on the gaming platform, a number of games published on the gaming platform by the developer, behavioral data of users associated with the developer on the gaming platform, moderation history of the developer on the gaming platform, or an average classification of games associated with the developer on the gaming platform.

13. The system of claim 11, wherein the data indicative of at least one user comprises one or more of: demographics of the user, a gameplay history of the user, behavioral data of other users associated with the user, moderation history of the user, chat history of the user, transaction history of the user, and an average classification of games played by the user.

14. The system of claim 11, wherein the data indicative of the game content comprises one or more of: textual description of the game, title of the game, assets of the game, models that make up the game, actions within the game, or an average classification of one or more other games with content within a similarity threshold of the game content.

15. The system of claim 11, wherein the operations further comprise, based on the determination that the game content includes prohibited content, restricting access to the game content via the gaming platform.

16. A non-transitory computer-readable medium with instructions stored thereon that, responsive to execution by a processing device, causes the processing device to perform operations comprising:
   receiving data associated with a game, the data indicative of at least one developer, at least one user, and game content;
   determining input features of a machine learning model based on the data indicative of the at least one developer, the at least one user, and the game content;
   providing the input features to the machine learning model; and
   obtaining an output of the machine learning model based on the input features, the output including a classification of the game.

17. The non-transitory computer-readable medium of claim 16, wherein the data indicative of the at least one developer comprises one or more of: a tenure of the developer on the gaming platform, a number of games published on the gaming platform by the developer, behavioral data of users associated with the developer on the gaming platform, moderation history of the developer on the gaming platform, or an average classification of games associated with the developer on the gaming platform.

18. The non-transitory computer-readable medium of claim 16, wherein the data indicative of at least one user comprises one or more of: demographics of the user, a gameplay history of the user, behavioral data of other users associated with the user, moderation history of the user, chat history of the user, transaction history of the user, or an average classification of games played by the user.

19. The non-transitory computer-readable medium of claim 16, wherein the data indicative of the game content comprises one or more of: textual description of the game, title of the game, assets of the game, models that make up the game, actions within the game, or an average classification of one or more other games with content within a similarity threshold of the game content.

20. The computer-implemented method of claim 16, wherein the classification of the game is a value indicative of the probability the game includes prohibited content.

* * * * *